Nov. 23, 1943. A. ZIMMERMAN 2,334,801
TIRE VALVE ACCESSORY
Filed July 5, 1940
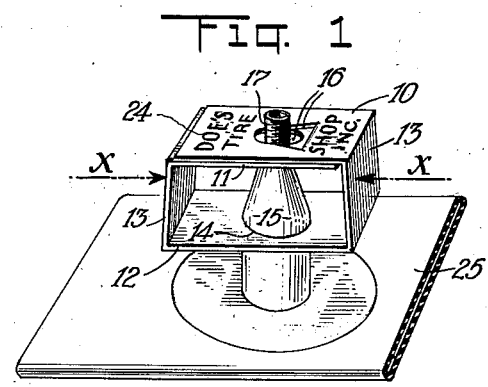
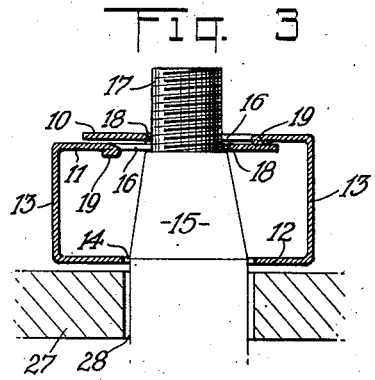
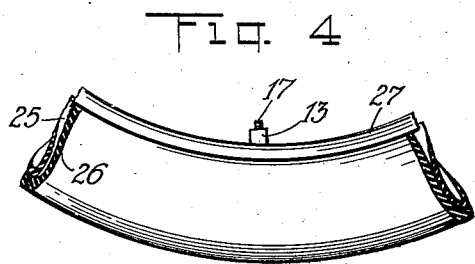
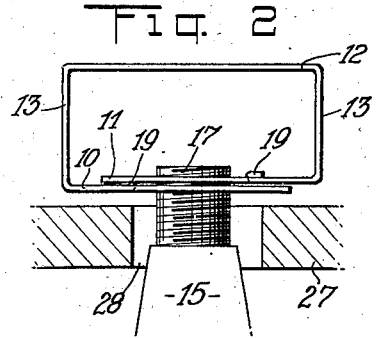
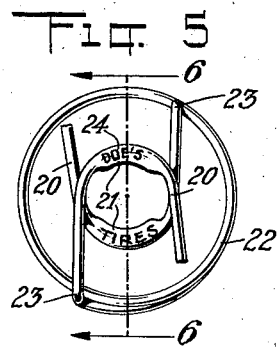
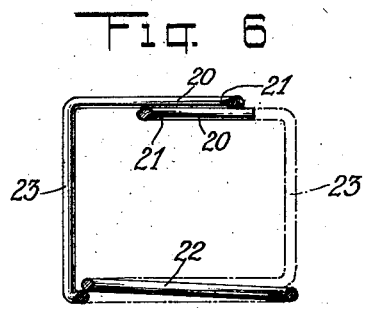
INVENTOR.
ARTHUR ZIMMERMAN
BY Howard P. Kmas
ATTORNEY.

Patented Nov. 23, 1943

2,334,801

UNITED STATES PATENT OFFICE 2,334,801

TIRE VALVE ACCESSORY

Arthur Zimmerman, New Rochelle, N. Y.

Application July 5, 1940, Serial No. 344,174

1 Claim. (Cl. 81—15.2)

This invention relates to tire valve accessories, and more particularly to such accessory applicable to and removable from a tire valve at will.

The objects of the invention are to provide a tire valve accessory by which a grip may be obtained upon the valve housing; to render a hold upon the tire valve housing to be more readily accomplished and maintained; to provide a holder applicable to the said housing either with the tube out of the shoe for initial inflation or within the shoe; to provide a means for gripping the housing when protruding only slightly through a rim; to enable the housing to be pulled to place in proper protruding position in a rim; to prevent pushing the valve housing back into the rim when applying the air-hose connection; to properly center and hold the housing for and during inflation of the mounted tube; to provide a holder of convenient size for carrying in one's pocket; to adapt the holder to use as an advertising medium; to secure simplicity of construction and operation; and to obtain other advantages and results as may be brought out in the following description.

Referring to the accompanying drawing in which like numerals of reference indicate similar parts throughout the several views:

Figure 1 is a perspective view of the accessory of the present invention being applied to a valve housing;

Figure 2 is a side view of the same showing use in pulling a valve housing through a rim;

Figure 3 is a similar view of the accessory, but in longitudinal section, and showing it holding the valve housing in its protruded position with respect to a rim;

Figure 4 is a face view of a portion of a rim and shoe, with the accessory in operative position upon the valve housing;

Figure 5 is a plan of a modified construction of accessory made of resilient wire; and Figure 6 is a sectional view of the same on line 6—6 of Figure 5.

In the specific embodiment of the invention illustrated in said drawing, and referring initially to Figures 1 to 4 inclusive, the accessory is shown as a rectangular structure bent from a strip of resilient metal or other material and with end portions 10, 11, one overlapping flatwise upon the other forming a double wall at that particular side. For convenience, the double wall side will be referred to as the top. The opposite or bottom wall 12 is parallel to and spaced from the top wall by integrally formed end walls 13, 13. The overlapping top wall portions 10, 11 are slidable with respect to each other by virtue of the resiliency of the said end walls.

The bottom wall 12 has an opening 14 therein, preferably at the center of the wall, large enough to receive and encircle the rubber or other body portion 15 of a tire-valve housing. The overlapping top walls 10, 11 are apertured, as at 16, 16 with the apertures having form in the nature of key-holes and one opposed to the other. Thus, smaller rounded ends of the key-hole shaped apertures will be complementary and adapted to grip on opposite sides of the threaded neck 17 of the tire valve housing. The resiliency of the walls of the accessory tends to pull the said smaller rounded ends of the key-hole shaped apertures toward each other and accordingly into gripping engagement with the said threaded neck when applied thereon. However, pressure, as indicated by arrows X, X, may be applied to the ends 13, 13 to move the flaring ends of the said apertures 16, 16 toward each other and thus increase the size of the opening through the double wall. Under those conditions, the device releases its gripping engagement with the threaded neck, and thus the accessory may be either applied to or removed from the neck. When no external application of pressure is present, the resiliency of the parts obtains a normal gripping action and effectually secures the accessory in place.

By preference, the edge of the metal facing inwardly of the apertures 16, 16 is beveled or sharpened, as at 18, for the semi-circumference of the smaller rounded ends thereof, whereby the beveled or sharpened edges will more positively and securely engage within the threads of the threaded neck. The ends of the apertures opposite from the sharpened edges 18, 18, may be rounded or doubled back, as at 19, 19, to assure non-gripping engagement with the threads when the operator presses those ends inward toward the stems for releasing purposes.

While the foregoing description has been specific, for purposes of disclosure and not by way of restriction, to a sheet metal structure, it is equally within the province of the invention to construct the same of resilient wire. Figures 5 and 6 illustrate the invention so constructed. In those figures, the top wall or overlapping portion is formed as hooked ends 20, 20 of wire which are slidable with respect to each other and provided with facing sharpened or beveled edges 21, 21 for engagement with the threads of the threaded neck of tire valve housing as above described. The hooked ends flare away from the sharpened edges, so that the said edges may be released by squeezing the device as more fully described above in connection with the preferred construction. The bottom wall of the instant construction comprises an integral loop 22 of the wire, and the end walls comprise upstanding connecting strands 23 of the same piece of wire integral both with the bottom loop and with the respective hooked overlapping upper portions.

In both instances, the device is adapted for use as an advertising medium by applying thereto lettering 24 of appropriate character to prepared or applied flat or extended surfaces thereon.

Use of either form of the invention enables the operator to apply the accessory to the valve housing of a tire tube 25, as in Fig. 1, and by merely inserting fingers beneath the accessory, between it and the tube, obtain a support in the hand to oppose necessary pressure in a contra direction of the air hose head (not shown) pressed against the outer end of the valve body for initial inflation of the tube. That accomplished, the accessory is temporarily removed while the tube is inserted in the usual shoes 26 and the shoe and tube applied upon usual rim 27. That proceeding involves inserting the valve-housing through a hole 28 in the rim, and often the said housing barely protrudes therethrough. By applying my accessory, at such time, upside down, as shown in Fig. 2, a grip is obtained upon the threads of the valve-housing, enabling it to be pulled through hole 28 as far as it will go. Then the accessory is removed, reversed and reapplied, as shown done in Figures 3 and 4. The bottom wall of the accessory not only encircles and centers the valve housing, but also rests against the rim and holds the housing in its protruding, centered position. The valve-housing is thus prevented from being pushed back into the rim or shoe when the air hose connection is pressed against it for inflating the tube. After such inflation, the valve-housing will be retained in place by the air pressure within the tube and the accessory may then be removed for use upon another tire being mounted.

Obviously other detail changes and modifications may be made in the construction and use of my improved tire-valve accessory, and I do not wish to be understood as limiting myself to the exact structures shown, except as recited in the light of the prior art.

I claim:

A tire valve accessory comprising a rectangular structure bent from a strip of resilient metal, the central portion of said strip forming a bottom wall, the end portions of said strip overlapping flatwise and forming a double walled top and said top and bottom being connected by end walls; a hole in said bottom wall to receive the body portion of a tire valve housing and a substantially triangular aperture in each of said overlapping portions forming an opening in said double walled top to receive the threaded neck of the tire valve housing, the apex of each of said triangular apertures pointing toward the free end of its portion, whereby the resiliency of the accessory walls normally causes the apices of said apertures to approach one another to reduce the size of said opening in order to non-tiltingly grip the said neck at spaced points, while movement of the walls in the direction to separate the said apices causes an increase in the size of said opening and releases the said tire valve housing.

ARTHUR ZIMMERMAN.